(12) United States Patent
Kumar

(10) Patent No.: US 8,815,187 B2
(45) Date of Patent: Aug. 26, 2014

(54) PROCESS AND SYSTEM FOR QUENCHING HEAT, SCRUBBING, CLEANING AND NEUTRALIZING ACIDIC MEDIA PRESENT IN THE FLUE GAS FROM THE FIRING OF FOSSIL FUEL

(76) Inventor: Subrahmanyam Kumar, Chennai (IN)

( * ) Notice: Subject to any disclaimer, the term of this patent is extended or adjusted under 35 U.S.C. 154(b) by 4 days.

(21) Appl. No.: 13/513,446

(22) PCT Filed: Dec. 1, 2010

(86) PCT No.: PCT/IN2010/000776
§ 371 (c)(1),
(2), (4) Date: Jun. 1, 2012

(87) PCT Pub. No.: WO2011/067784
PCT Pub. Date: Jun. 9, 2011

(65) Prior Publication Data
US 2012/0285353 A1    Nov. 15, 2012

(30) Foreign Application Priority Data

Dec. 2, 2009 (IN) .............................. 2967/CHE/2009
Aug. 6, 2010 (IN) .............................. 2249/CHE/2010

(51) Int. Cl.
*B01D 53/34* (2006.01)
*B01D 53/74* (2006.01)

(52) U.S. Cl.
USPC ........................................ 423/210; 422/168

(58) Field of Classification Search
USPC .......................................... 423/210; 422/168
See application file for complete search history.

(56) References Cited

U.S. PATENT DOCUMENTS

| | | | | |
|---|---|---|---|---|
| 5,141,727 A | * | 8/1992 | Varney | 423/243.01 |
| 5,690,899 A | * | 11/1997 | Makkinejad et al. | 423/243.01 |
| 5,756,058 A | * | 5/1998 | Watanabe et al. | 423/238 |
| 8,383,074 B2 | * | 2/2013 | Peng | 423/235 |
| 2006/0251559 A1 | * | 11/2006 | Schleicher et al. | 423/243.03 |
| 2010/0266472 A1 | * | 10/2010 | Peng | 423/243.01 |
| 2011/0274605 A1 | * | 11/2011 | Peng | 423/235 |

FOREIGN PATENT DOCUMENTS

| | | |
|---|---|---|
| CN | 1081119 A | 1/1994 |
| CN | 1597059 A | 3/2005 |
| EP | 0 588 587 A1 | 3/1994 |
| WO | WO 94/16992 A1 | 8/1994 |

\* cited by examiner

*Primary Examiner* — Timothy Vanoy
(74) *Attorney, Agent, or Firm* — Birch, Stewart, Kolasch & Birch, LLP

(57) ABSTRACT

The present invention provides a novel process for quenching heat, scrubbing, cleaning and neutralizing the hot and dirty fossil fuel fired flue gas liberated by a fossil fuel fired boiler using the high temperature and high pressure present in fossil fuel fired boiler blow-down comprising the steps of quenching the fossil fuel fired flue gas by evaporating sufficient quantity of water from sea water/scrubbing liquid and mixing vapors thus generated with hot and dirty flue gas; using the high temperature and high pressure present in fossil fuel fired boiler blow-down (waste water) for atomizing/spraying high alkalinity sea water/scrubbing liquid on said flue gas to neutralize the acidic substances in said flue gas.

8 Claims, 1 Drawing Sheet

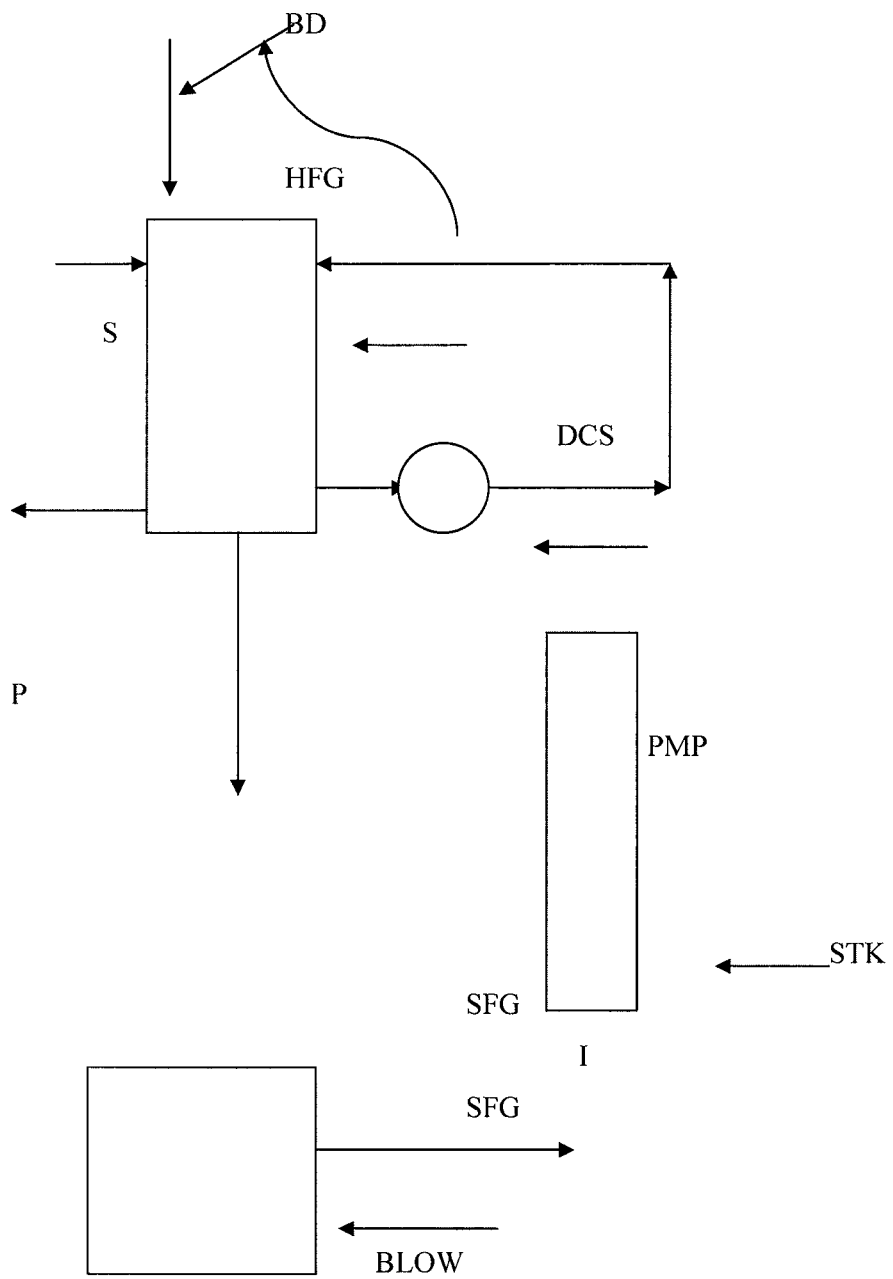

PROCESS AND SYSTEM FOR QUENCHING HEAT, SCRUBBING, CLEANING AND NEUTRALIZING ACIDIC MEDIA PRESENT IN THE FLUE GAS FROM THE FIRING OF FOSSIL FUEL

FIELD OF THE INVENTION

This invention relates to a novel process and system for quenching heat, scrubbing, cleaning and neutralizing acidic media present in fossil fuel fired flue gas. The invention in particular provides the process of neutralizing through scrubbing of the acidic media present in fossil fuel fired flue gas as well as trapping the suspended particulate matters present in the flue gas with highly alkaline scrubbing media.

BACKGROUND

Liquid, neutralization and scrubbing media is normally used for removal of acidic media (like oxides of Sulphur) present in fossil fuel fired flue gas. Highly Alkaline substance like Caustic Soda, Milk of lime etc are usually mixed in water and the dissolved solution is used as a liquid neutralization and scrubbing media in a direct contact scrubber. It is also normally not economical to neutralize the acidic media present in the flue gas by this method leading to the flue gas being dissipated into the atmosphere without scrubbing and cleaning.

Scrubbing the hot and dirty fossil fuel fired gas with seawater in a direct contact venturi scrubber/packed column is also carried out to trap the suspended particulate matters present in the flue gas as well as to neutralize the acidic media present in the flue gas with the alkaline matter present in seawater/scrubbing liquid. The pressure drop across the venturi scrubber increases the turbulence between the scrubbing liquid and the hot and dirty flue gas leading to intimate contact between them. This ensures neutralization of acidic media present in the flue gas as well as trapping of suspended particulate matter present in the flue gas—in the scrubbing liquid.

Waste heat present in fossil fuel fired flue gas which is normally being dissipated into the atmosphere can be used to evaporate some water from seawater. The concentrated seawater can then be used to neutralize the acidic gaseous media present in the same flue gas as long as the seawater is recycled with a bleed and not passed through the scrubber as once through.

OBJECT OF THE INVENTION

The object of this invention is to effectively utilize the waste heat present in the flue gas to concentrate seawater thus raising the alkaline value of seawater and generating a highly alkaline scrubbing media. Using the high temperature and high pressure of the blow down from a fossil fuel fired boiler to atomize the scrubbing media (concentrated/normal seawater) and spray the same into the flow of hot and dirty fossil fuel fired flue gas.

SUMMARY OF THE INVENTION

The present invention provides process of generating a highly alkaline scrubbing and neutralizing media by effectively utilizing the waste heat present in fossil fuel fired flue gas comprising mixing hot and dirty flue gas from a fossil fuel fired boiler into sufficient quantity of sea water, leading to evaporation of some water from the said sea water thereby increasing the alkalinity of the sea water.

By continuously repeating the cycles or re-circulating the sea water through the scrubber, enabling direct contact between hot and dirty fossil fuel fired flue gas and seawater, the seawater concentration increases leading to increase in the seawater alkalinity value and simultaneously this leads to efficient neutralization of the acidic media present in the said hot and dirty fossil fuel fired flue gas itself.

The invention further provides a process for atomizing and spraying the scrubbing liquid which can also be seawater to increase the probability of direct contact between the acidic media present in the hot and dirty fossil fuel fired flue gas and the alkaline matter present in the scrubbing liquid leading to scrubbing, cleaning and quenching of the said hot and dirty fossil fuel fired flue gas.

The process and system for atomizing and spraying of seawater/scrubbing liquid into hot and dirty flue gas envisages utilization of high temperature and high pressure present in boiler blow down from a fossil fuel fired boiler, leading to quenching, scrubbing and cleaning of the flue gas itself. The contact between the alkaline matter present in seawater/scrubbing liquid and the acidic media present in the hot and dirty flue gas is raised due to the fine atomized spraying of the scrubbing media directly into the flow of fossil fuel fired flue gas. This leads to neutralization of the acidic media as well as trapping of suspended particulate matters present in hot and dirty fossil fuel fired flue gas by the seawater/scrubbing liquid.

Further this process is environment friendly.

DETAILED DESCRIPTION OF THE DRAWING

FIG. 1: flow chart of the system

DETAILED DESCRIPTION OF THE INVENTION

The present invention provides process of generating a highly alkaline scrubbing and neutralizing media by effectively utilizing the waste heat present in fossil fuel fired flue gas. According to one of the embodiment, with the help of an appropriate Direct Contact Evaporator/Venturi Scrubber/spray tower/packed column etc. hot and dirty flue gas from a fossil fuel fired boiler is mixed into sufficient quantity of seawater. With some water from seawater evaporating, the alkalinity value of the seawater is raised, thus increasing the efficiency of the now concentrated seawater to be utilized as a scrubbing and cleaning media in the direct contact scrubber itself, to neutralize the acidic substance present in the said hot and dirty fossil fuel fired flue gas.

Seawater normally has a Total Dissolved Solids of around 3.5 parts per million. By evaporating and removing some water from seawater the (TDS) Total Dissolved Solids of the said sea water can be raised to more than 20 parts per million.

According to another embodiment of the invention instead of maintaining a high pressure drop across an appropriately designed Direct Contact Evaporator/Venturi Scrubber for enhancing contact between hot and dirty flue gas from a fossil fuel fired boiler with sufficient quantity of seawater/scrubbing liquid there by creating high turbulence in the throat area of the venturi scrubber; it is now advocated that the high temperature and high pressure present in the boiler blowdown (waste water) to be appropriately used to atomize and spray the seawater/scrubbing liquid into the flow of hot and dirty flue gas.

Conventionally there are normally two methods for atomising a liquid—1) pressure atomisation and 2) auxiliary fluid atomisation. In Pressure atomization the liquid is pressurized with the help of pumps. The pressurized liquid is then released through nozzles which have tiny pores/holes where it expands and atomises itself. Commonly the the nozzle will get chocked/blocked by the suspended particles in the liquid. This drawback is overcome by the auxiliary fluid atomization.

In the present invention the scrubbing liquid (concentrated seawater) will have fine suspended particulate matters. Due to this present invention advocates auxiliary fluid atomisation.

Normally steam at 4 to 7 bar pressure or compressed air at 4 to 7 bar pressure is used as the auxiliary fluid for atomisation. The present invention advocates a waste fluid (boiler blow-down under pressure) as the auxiliary atomisation agent. The waste fluid is released by the boiler under tremendous pressure. When this pressure is released the fluid flashes into vapor and expands—during the process disintegrates/atomises the scrubbing liquid adjacent to it. Therefore, there will be two pipes of about six inches with one pipe placed inside another. There is NO NOZZLE with tiny holes/pores at the end of the tubes to get choked and blocked. The auxiliary fluid under pressure is sent through one of the pipes while the liquid to be atomised is sent through the other. When the pressure of the auxiliary fluid is released near the mouth of the pipe it will suddenly expand and in the process atomise the other liquid released by the adjacent pipe.

According to the present invention for creating high turbulence between the flue gas and the scrubbing liquid in a Venturi scrubber the pressure drop across its throat has to be high, leading to increase in electric power consumption by the blower handling the flue gas. With the spraying of fine atomized seawater/scrubbing liquid, into the flow of hot and dirty flue gas, using the high temperature and high pressure present in the waste boiler blow-down, the same results can be achieved if not better. The intimate contact as well as contact period between the hot and dirty flue gas and seawater/scrubbing liquid increases substantially, leading to neutralization of acidic media present in the flue gas and trapping of suspended particulate matters present in the flue gas.

With some water from seawater evaporating, the alkalinity value of the seawater is raised, thus increasing the efficiency of the now concentrated seawater to be utilized as a scrubbing and cleaning media in the direct contact scrubber to neutralize the acidic substance present in the fossil fuel fired flue gas.

In the process some water from seawater will evaporate and mix with the flue gas, leading to quenching of the flue gas. Intimate mixing between the fossil fuel fired flue gas and the scrubbing liquid/seawater will neutralize the acidic media present in the flue gas and also trap the suspended particulate matters present in the hot and dirty flue gas. The concentration of seawater will simultaneously increase thus making it more alkaline and more conducive to neutralize the acidic gaseous media (oxides of Sulphur) present in the hot and dirty flue gas. This is achieved by spraying atomized seawater/scrubbing liquid into the flow of hot and dirty flue gas. Seawater/scrubbing liquid are atomized with the help of high temperature and high pressure blow-down released by the fossil fuel fired boiler.

Normally, in the DCS (Direct Contact Scrubber) the high alkalinity water is sprayed into hot stream of flue gas. The acidic substance present in the flue gas will get neutralized while suspended particulate matters present in the flue gas will also get trapped in the water stream. The flue gas heat/temperature will also get quenched during the process. The pressure drop across the venturi is directly related to the efficient scrubbing and cleaning of the hot-dirty flue gas. Higher the pressure drop across the venturi scrubber there will be increase in electric power consumption by the blower BLOW to convey the flue gas. Due to atomized spraying of seawater/scrubbing liquid through nozzle BD in the hot duct HFG before the DCS, the pressure drop across the venturi scrubber/DCS need not be very high.

Hot flue gas is let into the duct before the DCS through inlet HFG and warm saturated flue gas is removed through outlet SFG. The spent brackish water with suspended solids and the neutralized substance is removed through outlet P. Fresh seawater is introduced to the DCS through nozzle S. Continuous re-circulation of seawater using pump PMP will raise the concentration level of the seawater making it more conducive to neutralize the acidic media present in the hot and dirty flue gas.

A blower BLOW shall assist in flow of flue gas through complete system before it is dissipated back into the atmosphere through inlet STK. The Saturated Flue Gas may also be sent for further cooling and processing before it is liberated into the atmosphere. Necessary instrumentation like temperature and pressure gauges shall be provided for smooth and normal operation of the system. Necessary safe guard for operating personnel shall be provided.

The invention will now be explained with the help of following examples. However, the scope of the invention should not be limited to these examples and embodiments, as a person skilled in the art can make necessary variations in the invention.

Example 1

A Process and System for Generation of Concentrated Seawater

Acidic gaseous media present in fossil fuel fired flue gas can be scrubbed and neutralized with highly alkaline scrubbing media, which has been prepared by concentrating seawater.

Concentrated seawater can also be generated in lagoons using 'SOLAR' energy as the heating media and this concentrated seawater can be introduced to the scrubber for further concentration and hot flue gas scrubbing.

Part of the hot and dirty flue gas at 140 degree C. from a coal fired boiler was diverted to the quencher cum scrubber. Concentrated seawater (at 10 Bohme) from nearby salt pans was continuously re-circulated through the scrubber. The flue gas temperature dropped to 60 degree C. and the seawater concentration kept rising to near 20 Bohme. The acidic media i.e. the oxides of Sulphur present in the flue gas get completely neutralized by the alkaline matter present in the concentrated seawater. Normal seawater has 4 Bohme salt concentrations and above 24 Bohme rock salt is formed/crystallizes out.

Naturally, the quantity of concentrated seawater required to be circulated through the scrubber to neutralize the acidic media in the flue gas is far less, in comparison to the quantity of normal seawater required to be sent through the scrubber as 'ONCE THROUGH' scrubber liquid. There is saving on scrubber liquid (seawater) pumping cost. The overall neutralization efficiency increased due to concentrated seawater.

By atomizing and spraying the concentrated seawater directly into the flow of hot flue gas we were able to raise the contact time between the acidic media and the alkaline matter and also create/generate more turbulence to ensure contact between them.

ADVANTAGES OF THE INVENTION

The present invention offers a significantly economic solution, with low production cost to quench, clean and scrub hot and dirty flue gas with high alkalinity scrubbing liquid from brackish water/seawater in large quantity; by effectively utilizing the waste heat present in the hot and dirty flue gas liberated by a fossil fuel fired boiler.

The invention provides effective utilization of the high temperature and high pressure present in boiler blow-down from fossil fuel fired boiler—through atomization and spraying of scrubbing liquid into the stream of hot and dirty fossil fuel fired flue gas.

The invention enables easy, convenient and alternative method for cleaning and scrubbing of flue gas before disposal/dissipation into the atmosphere.

I claim:

1. The process for quenching heat, scrubbing, cleaning and neutralizing the hot and dirty fossil fuel fired flue gas liberated by a fossil fuel fired boiler comprising:
   quenching the fossil fuel fired flue gas by evaporating sufficient quantity of water from sea water and mixing vapours thus generated with hot and dirty flue gas;
   using the high temperature and high pressure present in fossil fuel fired boiler blow-down (waste water) for atomizing or spraying high alkalinity sea water on said flue gas to neutralize the acidic substances in said flue gas.

2. The process for quenching heat, scrubbing, cleaning and neutralizing the hot and dirty fossil fuel fired flue gas liberated by a fossil fuel fired boiler as claimed in claim 1, wherein the blow-down temperature and pressure varies, according to the quantity of steam generated, quality of boiler feed water, final usage of the steam generated.

3. The process for quenching heat, scrubbing, cleaning and neutralizing the hot and dirty fossil fuel fired flue gas liberated by a fossil fuel fired boiler as claimed in claim 1, wherein auxiliary fluid atomization process is used for atomization of high alkalinity sea water.

4. The process of generating a highly alkaline scrubbing and neutralizing media by effectively utilizing the waste heat present in fossil fuel fired flue gas comprising:
   mixing hot and dirty flue gas liberated by a fossil fuel fired boiler into sufficient quantity of sea water;
   evaporating water from the sea water or scrubbing liquid thereby increasing the alkalinity of the said sea water,
   repeating the cycles or re-circulating the scrubbing liquid several time to increase the alkalinity of sea water and to be simultaneously used as a scrubbing and neutralizing media.

5. A system for quenching heat, scrubbing, cleaning and neutralizing the hot and dirty fossil fuel fired flue gas from a fossil fuel fired boiler comprising:
   a DCS (Direct Contact Scrubber) or a Venturi Scrubber and a first nozzle, wherein fresh sea water or scrubbing liquid is introduced to the DCS or the Venturi Scrubber through the first nozzle;
   a pump through which continuous circulation of said sea water is maintained for increasing its alkalinity;
   a duct through which hot and dirty flue gas is introduced to the DCS;
   a second nozzle through which high temperature and high pressure fossil fuel fired boiler blow-down is introduced;
   wherein the second nozzle is utilized to atomize and spray some of the scrubbing liquid into the hot stream of fossil fuel fired flue gas passing through a duct before DCS or Venturi Scrubber such that high alkalinity sea water is brought in contact with hot stream of fossil fuel fired flue gas in the DCS or the Venturi Scrubber;
   a first outlet through which saturated or unsaturated fossil fuel fired flue gas is removed;
   a second outlet through which spent alkaline sea water or scrubber liquid with suspended solids and neutralized substances are removed; and
   a blower to assist the flow of said flue gas thorough the complete system before dissipating said flue gas into the atmosphere through an inlet.

6. The system as claimed in claim 5, wherein the second nozzle is configured to bring the high alkalinity sea water in contact with hot stream of fossil fuel fired flue gas by atomizing or spraying.

7. The system as claimed in claim 5, wherein the pressure drop occurs across DCS or Venturi Scrubber.

8. The system as claimed in claim 5, wherein the variation of pressure drop across the DCS or Venturi Scrubber is directly proportional to the electric power consumption by the blower BLOW.

* * * * *